(12) United States Patent
Rex et al.

(10) Patent No.: US 9,399,707 B2
(45) Date of Patent: Jul. 26, 2016

(54) USE OF ALUMINA TRIHYDRATE IN COMPOSITES

(71) Applicant: JM Huber Corporation, Atlanta, GA (US)

(72) Inventors: Gary Charles Rex, Canton, GA (US); Mark Anthony Herndon, Fairmount, GA (US)

(73) Assignee: J.M. Huber Corporation, Atlanta, GA (US)

( * ) Notice: Subject to any disclaimer, the term of this patent is extended or adjusted under 35 U.S.C. 154(b) by 0 days.

(21) Appl. No.: 13/834,952

(22) Filed: Mar. 15, 2013

(65) Prior Publication Data

US 2014/0031479 A1 Jan. 30, 2014

Related U.S. Application Data

(60) Provisional application No. 61/675,486, filed on Jul. 25, 2012.

(51) Int. Cl.
| | |
|---|---|
| *C08K 3/04* | (2006.01) |
| *C08K 3/22* | (2006.01) |
| *C08K 3/40* | (2006.01) |
| *C08K 7/14* | (2006.01) |

(52) U.S. Cl.
CPC ... *C08K 3/04* (2013.01); *C08K 3/22* (2013.01); *C08K 3/40* (2013.01); *C08K 7/14* (2013.01); *C08K 2003/2224* (2013.01); *C08K 2003/2227* (2013.01); *C08L 2201/02* (2013.01)

(58) Field of Classification Search
CPC .............. C08K 3/04; C08K 3/22; C08K 3/40; C08K 7/14; C08K 2003/2277; C08K 2003/2224; C08L 67/06; C08L 2201/02
USPC ................................. 524/494, 560
See application file for complete search history.

(56) References Cited

U.S. PATENT DOCUMENTS

| | | | | |
|---|---|---|---|---|
| 3,926,902 A | * | 12/1975 | Bowen | 523/509 |
| 3,967,004 A | * | 6/1976 | Oda et al. | 427/196 |
| 4,043,988 A | * | 8/1977 | Cooke et al. | 525/169 |
| 4,087,414 A | * | 5/1978 | Kamiyama et al. | 525/504 |
| 4,277,532 A | * | 7/1981 | Czepel et al. | 442/150 |
| 4,795,776 A | * | 1/1989 | Milner | 524/386 |
| 5,942,561 A | * | 8/1999 | Okisaki et al. | 523/179 |
| 6,031,040 A | * | 2/2000 | Horacek | 524/495 |
| 6,046,258 A | * | 4/2000 | Katsube et al. | 523/513 |
| 6,102,995 A | * | 8/2000 | Hutchings et al. | 106/18.15 |
| 2003/0160358 A1 | * | 8/2003 | De Koning | B29B 7/88 264/211 |
| 2004/0102550 A1 | * | 5/2004 | Dang | C08L 23/04 524/115 |
| 2006/0008664 A1 | | 1/2006 | Wakabayashi et al. | |
| 2006/0273290 A1 | * | 12/2006 | Khan et al. | 252/606 |
| 2007/0179223 A1 | * | 8/2007 | Hiroshige et al. | 524/100 |
| 2009/0048379 A1 | * | 2/2009 | Weinberg | C08L 71/00 524/420 |
| 2009/0295103 A1 | | 12/2009 | Ebina et al. | |

FOREIGN PATENT DOCUMENTS

| | | | | |
|---|---|---|---|---|
| CN | 101333111 A | | 12/2008 | |
| DE | 10302198 | * | 1/2003 | ............ C09K 21/00 |
| EP | 2397514 A2 | | 12/2011 | |
| JP | H0885189 A | | 4/1996 | |
| JP | 2005023192 A | | 1/2005 | |
| WO | WO 2012/048860 | * | 4/2013 | ............ C04B 24/26 |

OTHER PUBLICATIONS

Mesh to micron converision p. 1, obtained online from http://www.gclabequipment.com/qc_sieve_conversion.pdf.*
English translation of WO 2012/048860, pp. 1-9.*
English translation of DE 10302198, pp. 1-8.*
Derwent Abstract of WO 2012048860, pp. 1-4.*
Derwent Abstract of DE 10302198, pp. 1-8.*
GREP-EG Product Information—Suzuhiro Chemical Co. Ltd, pp. 1-3.*
Aluminum Trihydrate Material Safety Data Sheet, pp. 1-7, Alcoa, Feb. 16, 2006.*
English language translation of JP 2005-023192, pp. 1-9.*
Derwent Abstract of JP 2005-023192, pp. 1-3.*
GREP-EP Product Information, pp. 1-3, obtained from http://www.chemical-suzuhiro.co.jp/EN/p-GREP-EG_e.html.*
Mesh to Microns Conversion, pp. 1-2, obtained online from http://www.js-aoxin.com/en/shownews.asp?id=75.*
Nyacol Nyagraph Data Sheet, p. 1; Published Mar. 13, 2007, obtained from: https://web.archive.org/web/*/http://www.nyacol.com/pdf/nyagraph_data_sheet.pdf.*
International Search Report mailed on Oct. 1, 2013 for PCT/US/2013/051661 filed Jul. 23, 2013 (Applicant—J.M. Huber Corporation; Inventor—Rex, et al.) (6 pages).
Written Opinion mailed on Oct. 1, 2013 for PCT/US2013/051661 filed Jul. 23, 2013 (Applicant—J.M. Huber Corporation; Inventor—Rex, et al.) (5 pages).

* cited by examiner

Primary Examiner — Alexander Kollias
(74) Attorney, Agent, or Firm — Merchant & Gould P.C.

(57) ABSTRACT

A composite comprising a flame retardant, such as ATH and an expandable graphite is disclosed.

34 Claims, 8 Drawing Sheets

USE OF ALUMINA TRIHYDRATE IN COMPOSITES

CROSS REFERENCE TO RELATED APPLICATIONS

The present application claims the benefit of priority to U.S. Provisional Patent Application Ser. No. 61/675,486, filed on Jul. 25, 2012, which is hereby incorporated by reference in its entirety.

BACKGROUND

1. Technical Field

The present disclosure relates to composite materials and flame retardants for use therein.

2. Technical Background

Alumina Trihydrate (ATH) is frequently added to polymer compositions to impart flame retardant properties. For many polymer compositions and applications, relatively high loading levels of ATH are necessary to impart the desired level of flame retardance to the material. Such high loading levels can make the processing and molding of loaded polymer compositions difficult, and can result in degraded physical properties of the materials.

Thus, there is a need to address the aforementioned problems and other shortcomings associated with traditional ATH loaded polymer compositions. These needs and other needs are satisfied by the compositions and methods of the present disclosure.

SUMMARY

In accordance with the purpose(s) of the invention, as embodied and broadly described herein, this disclosure, in one aspect, relates to composite materials and flame retardants for use therein.

In one aspect, the present disclosure provides a composition comprising aluminum trihydrate and expandable graphite.

In another aspect, the present disclosure provides a composite comprising a polymer, ATH, and expandable graphite.

In another aspect, the present disclosure provides a method for preparing a flame retardant composite comprising contacting a polymer, ATH, and expandable graphite.

BRIEF DESCRIPTION OF THE FIGURES

The accompanying figures, which are incorporated in and constitute a part of this specification, illustrate several aspects and together with the description serve to explain the principles of the invention.

Figure 1:
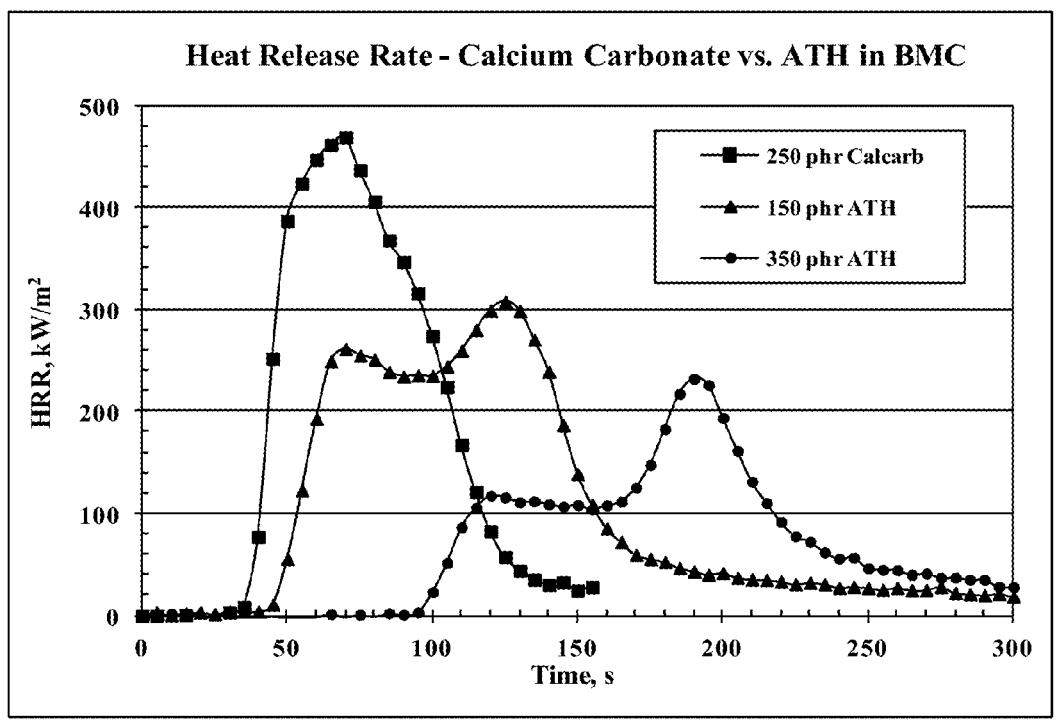
FIG. 1 is cone calorimetry plot of Heat Release Rate (HRR) versus time for three fiberglass composites (20 wt. %) having 150 phr, and 350 phr of ATH, and one containing 250 phr ground calcium carbonate.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used herein, unless specifically stated to the contrary, the singular forms "a," "an" and "the" include plural referents unless the context clearly dictates otherwise. Thus, for example, reference to "a filler" or "a solvent" includes mixtures of two or more fillers, or solvents, respectively.

As used herein, unless specifically stated to the contrary, the abbreviation "phr" is intended to refer to parts per hundred, as is typically used in the plastics industry to describe the relative amount of each ingredient in a composition. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides a composition comprising ATH and expandable graphite. In one aspect, the disclosure provides a polymer composition comprising ATH and expandable graphite. In various aspects, the polymer composition can also comprise a reinforcing fiber, such as, for example, glass fibers. ATH has been used as a flame retardant in various materials, but such use can have adverse effects on the resulting materials. For example, in thermoplastics, relatively high loadings of ATH can be required to impart sufficient flame retardant properties to meet the demands of customers and/or regulations. The use of such high loading levels of ATH can adversely affect the ability to compound and mold the resulting material. The physical properties of the resulting material can also be degraded at these high levels. Thus, in one aspect, the present invention provides methods and compositions that can improve the efficacy of ATH in a polymeric composition, such that a reduced amount of ATH can be used to achieve desired properties, or that the resulting material can exhibit superior physical and handling properties at comparable loadings. In another aspect, the present invention provides a composition wherein a synergistic effect is obtained from the combination of ATH and expandable graphite, when incorporated into a polymeric matrix.

The polymer of the present invention can comprise any polymer suitable for use in the compositions described herein. In one aspect, the polymer can comprise a thermosetting polymer. In one aspect, a thermoset polymer does not exhibit a melt phase upon heating, and can go directly from a solid to a gas phase upon combustion. In another aspect, the polymer does not form a char upon heating. In another aspect, the polymer can comprise of a polyester, such as an unsaturated polyester. In one aspect, the polymer can comprise of an isophthalic polyester, such as, for example, a Vipel T764-67 isophthalic polyester resin, available from AOC, Collierville, Tenn., USA. In yet another aspect, the polymer can comprise one or more modifications of an unsaturated polyester such as orthophthalic acid, terephthalic acid, dicyclopentadiene, variations of glycol type, etc. In another aspect, other thermosetting polymers can comprise vinyl ester resins, or epoxy resins, or combinations thereof. In another aspect, the polymer can comprise a polyester/fiberglass composition. In other aspects, the polymer cannot be shaped or molded after curing or cross-linking. In one aspect, the polymer does not comprise an elastomer. In another aspect, the polymer can comprise one or more elastomeric components, but wherein the overall polymer composition is not considered elastomeric or exhibits elastomeric properties. In one aspect, the polymer is not a thermoplastic. In another aspect, the polymer can be or comprise a thermoplastic, such as, for example, ethylene vinyl acetate, low density polyethylene, polyvinyl chloride, or another thermoplastic or mixture of thermoplastics, provided that the process temperature of the thermoplastic does not exceed the decomposition temperature of ATH (>220 deg. C.). In one aspect, the resulting composite can comprise triethylphosphate. In another aspect, the resulting composite containing the polymer does not comprise a phosphate compound and/or triethylphosphate.

In one aspect, the polymer can be a mixture of two more individual polymeric materials, a copolymer of two or more polymeric materials, or a combination thereof. In still other aspects, the polymer can comprise an analog or derivative of any of the polymeric materials described herein or that one of skill in the art would identify as appropriate in view of this disclosure. In other aspects, the polymer can optionally comprise one or more additives, such as, for example, a cross-linking agent, surfactant, shrinkage modifier, gloss modifier, catalyst component and/or reaction product thereof, impact modifier, cure modifier, viscosity or rheological modifier, wetting agent, dispersing agent, antioxidant, lubricant, release agent, gelling agent, tack modifier, flow agent, acid scavenger, defoamer, processing aid, binder, or a combination thereof. In other aspects, the polymer can comprise one or more components not specifically recited herein, but that one of skill in the art would use in such a composition.

In one aspect, the polymer can comprise and/or be prepared from a mixture of polymeric components, monomeric components, catalysts, additives, or a combination thereof. In various aspects, the polymer can be prepared from an unsaturated polyester, such as, for example, a Vipel T764-67 isophthalic polyester resin. In various aspects, such an isophthalic polyester resin can comprise any suitable concentration in the polymer, for example, from about 25 wt. % to about 100 wt. %, from about 40 wt. % to about 85 wt. %, from about 50 wt. % to about 65 wt. %, or about 56.5%. In another aspect, the polymer can comprise or be prepared from a polymer powder, such as, for example, a microtine low density polyethylene powder. In various aspects, such a polymer powder can act as an additive to reduce shrinkage and/or improve gloss in a composition. If present, such a polymer powder can be present at any suitable concentration, for example, from about 0.1 wt. % to about 20 wt. %, from about 1 wt. % to about 10 wt. %, from about 4 wt. % to about 6 wt. %, or about 4.5 wt. %. Microfine low density polyethylene powders, such as, for example, Microthene FN510, are available from Equistar Chemicals, Houston, Tex., USA. The polymer can also optionally comprise or be prepared from a styrene monomer that can be mixed with and/or cross-linked to any other polymeric component. A styrene monomer, if present, can be present at any suitable concentration, for example, from about 1 wt. % to about 50 wt. %, from about 10 wt. % to about 30 wt. %, or about 18.25 wt. %. The polymer can also optional comprise or be prepared from a polymerization catalyst and/or cross-linking agent, such as, for example, LUPEROX® P tert-butyl perbenzoate. Such a cross-linking agent, if used, can be present in any suitable concentration, from example, from about 0.01 wt. % to about 10 wt. %, from about 0.5 wt. % to about 5 wt. %, from 0.5 wt. % to about 1.5 wt. %, or about 1 wt. %.

In another aspect, the polymer can comprise or be prepared using a modifier, such as, for example, a 5% para benzoquinone inhibitor in diallyl phthalate. In one aspect, such a modifier, can be useful for delaying cross-linking of the polyester by reacting with a peroxide initiator. If present, such a modifier can be used at any suitable concentration, for example, from about 0.01 wt. % to about 5 wt. %, from about 0.01 wt. % to about 1.5 wt. %, from about 0.1 wt. % to about 0.8 wt. %, or about 0.38 wt. %. In another aspect, the polymer can comprise or be prepared using a cure modifier, such as, for example, trimethylolpropane trimethacrylate, and if present, can be used at any suitable concentration, for example, from about 0.1 wt. % to about 15 wt. %, from about 0.1 wt. % to about 10 wt. %, from about 1 wt. % to about 8 wt. %, from about 4 wt. % to about 6 wt. %, or about 4.5 wt. %. If present, such a cure modifier can impart weatherability, chemical and/or water resistance, hardness, abrasion resistance, heat resistance, or a combination thereof to a resulting composite. In another aspect, the polymer can comprise or be prepared using a wetting and/or dispersing agent. If present, a wetting and/or dispersing agent can comprise a polymer or copolymer having acidic functional groups, such as, for example, BYK9010, available from BYK Chemie, and can be used at any suitable concentration, for example, from about 0.1 wt. % to about 15 wt. %, from about 0.1 wt. % to about 10 wt. %, from about 1 wt. % to about 8 wt. %, from about 4 wt. % to about 6 wt. %, or about 4.5 wt. %. In another aspect, the polymer can comprise or be prepared using a viscosity modifier, such as, for example, a triethylphosphate, available from Eastman Chemical, Kingsport, Tenn., USA. If present, such a viscosity modifier, can be used at any suitable concentration, for example, from about 0.01 wt. % to about 10 wt. %, from about 0.1 wt. % to about 5 wt. %, from about 1 wt. % to about 3 wt. %, or about 1.8 wt. %. In another aspect, the polymer can comprise or be prepared using a pigment, such as, for example, CF210, available from Plasticolors, and if present, can be used at any suitable concentration, for example, from about 0.1 wt. % to about 15 wt. %, from about 0.1 wt. % to about 10 wt. %, from about 1 wt. % to about 8 wt. %, from about 4 wt. % to about 6 wt. %, or about 4.5 wt. %.

In yet another aspect, the polymer can comprise or be prepared using a mold release and/or lubricating agent, such as, for example, calcium stearate and/or zinc stearate. If present, such a mold release and/or lubricating agent can be used in any suitable concentration, for example, from about 0.01 wt. % to about 10 wt. %, from about 0.1 wt. % to about 5 wt. %, from about 1 wt. % to about 3 wt. %, or about 1.8 wt. %. In yet another aspect, the polymer can comprise or be prepared using fatty acids or a mixture of, for example, distilled saturated fatty acids, such as INDUSTRENE® B, available from Crompton Corporation, Greenwich, Conn., USA. If present, such a fatty acid or mixture of fatty acids can be used at any suitable concentration, for example, from about 0.01 wt. % to about 10 wt. %, from about 0.1 wt. % to about 5 wt. %, from about 1 wt. % to about 3 wt. %, or about 1.8 wt. %. It should be noted that the polymer can comprise and/or be prepared using other components not specifically recited herein, and that the present invention is not intended to be limited to any particular polymer composition or additives.

In one aspect, the polymer is loaded and/or reinforced with a plurality of fibers, such as, for example glass fibers. The specific composition and/or loading level of fibers in the polymer can vary, and the present invention is not intended to be limited by any particular fiber loading level in the polymer. In one aspect, the amount of fiber present in a fiber loaded polymer can be at least about 10 wt. %, for example, about 10, 20, 30, 40, 50 wt. % or more; at least about 30 wt. %, for example, about 30, 35, 40, 45, 50, 55, 60, or 65 wt. % or more; at least about 40 wt. %, for example, about 40, 42, 44, 46, 48, 50, 52, 54, 56, 58, 60, 62, 64, 66, 68, or 70 wt. % or more; or at least about 50 wt. %, for example, about 52, 53, 55, 57, 59, 61, 63, 65, 67, or 69 wt. % or more. In another aspect, the amount of fiber present in a fiber loaded polymer can comprise from about 15 wt. % to about 50 wt. % of the composite. In a specific aspect, the fiber can comprise about 20 wt. % of the reinforced composite material. In other aspects, the specific concentration of fibers can be lower than or higher than any value specifically recited herein, and the present invention is not intended to be limited to any particular value or range. In one aspect, the synergistic effect obtained with expandable graphite and ATH can be achieved no or substantially no reinforcing fibers present.

In another aspect, the polymer can comprise a bulk molding compound (BMC) or composite that can be used in compression and/or injection molding systems. In one aspect, a BMC can be prepared by mixing strands of fibers, for example, chopped glass fibers, with the polymer, for example, a polyester resin. And in yet another aspect, the polymer can comprise a sheet molding compound (SMC) that can be used in, for example, compression and/or injection molding systems.

The ATH of the present invention can comprise any grade of ATH suitable for use with the selected polymer. In one aspect, the ATH can have a particle size of about 25 µm and a surface area of about 1 $m^2/g$. In another aspect, the ATH can have a particle size of about 3.5 µm and a surface area of about 8 $m^2/g$. In other aspects, the particle size and/or surface area can be less than or greater than any value specifically recited herein. ATH materials are commercially available, for example, MOLDX® A100, available from J. M. Huber, Atlanta Ga., USA.

ATH, $Al(OH)_3$, decomposes upon heating to form alumina and water. When incorporated as a flame retardant, the ATH can absorb heat and subsequently release water vapor upon decomposition. It is believed that the released water vapor can act as a vapor barrier to prevent or minimize combustion and/or decomposition of the underlying material. In one aspect, the primary flame retardant mechanism of ATH is believed to be a reduction in the rate of pyrolysis or decomposition of the polymer by absorbing heat, thereby reducing the rate of combustion.

The amount of metal hydroxide, such as, for example, ATH utilized in any composite or precursor thereto can vary, depending on the specific properties of the materials and/or desired of the final product. In one aspect, ATH can be present in a composite at a level of from about 150 phr to about 350 phr, for example, about 150, 170, 190, 210, 230, 250, 270, 290, 310, 330, or 350 phr. In another aspect, ATH can be present in a composite at a level of from about 200 phr to about 320 phr, for example, about 200, 210, 220, 230, 240, 250, 260, 270, 280, 290, 300, 310, or 320 phr. In other aspects, the amount of ATH present in a composite can be less than about 150 phr or greater than about 350 phr, and the present invention is not intended to be limited to any particular level of ATH present in a composite.

The thermal behavior of polymer materials, such as, for example, polyester, can be evaluated using cone calorimetry, wherein ignition time, mass loss, heat release rate, smoke production rate, specific extinction area (SEA or "smokiness of the fuel") and combustion products can be monitored. In one aspect, a polymer material can be evaluated according to ASTM E-84 test protocols to determine the surface burning characteristics of the material. With respect to the figures, each of the samples prepared and illustrated in the figures attached to this disclosure were prepared with an organic resin, as described in Example 1. The resulting paste compositions were subsequently mixed with glass fibers and expandable graphite, as noted in the description of each figure. With respect to FIG. 1, heat release rates were measured for unsaturated polyester BMC materials loaded with 250 phr ground calcium carbonate, 150 phr ATH, and 350 phr ATH, respectively. The BMC sample prepared with ground calcium carbonate exhibited no flame retardancy, as illustrated by the height of the single heat release peak. This peak is attributed to combustion of the BMC material.

In contrast, the BMC samples prepared with ATH exhibited varying degrees of flame retardancy, as illustrated by the lower height or relative flattening of the heat release curves over the x-axis or time coordinate. The lower heat release rates of the samples prepared with ATH can be attributed to the endothermic decomposition of the ATH and the release of water vapor as described above. The initial heat release peak in these samples represents the onset of combustion and the resulting ATH decomposition. The subsequent valley is indicative of an equilibrium process that occurs as a result thereof. As the ATH is consumed (i.e., decomposed), this equilibrium is lost and combustion of the polymer material can continue unabated. The second heat release peak for these samples represents the loss (i.e., 100% consumption) of ATH.

The compositions of the present invention also comprise expandable graphite. Expandable graphites are intercalated graphite materials that can expand upon exposure to heat. They are typically prepared by intercalating an acid, such as sulfuric acid, nitric acid, or acetic acid, into the graphite lattice, such that upon heating, the intercalated ions can produce large amounts of gaseous decomposition products and expand the lattice. In one aspect, the expandable graphite can have a purity of at least about 95%, for example, greater than about 95, 97, 98, or 99%. In another aspect, the expandable graphite can have an initial expansion temperature of from about 150° C. to about 200° C. In another aspect, the initial expansion temperature of an expandable graphite can be selected by one of skill in the art based on the polymer into which it is being mixed. In yet another aspect, the expandable graphite can have an expansion volume of from about 35 to about 50 ml/g, greater than about 250 ml/g, or greater than about 350 ml/g. In another aspect, the expandable graphite should exhibit an expansion volume sufficient to reduce the thermal conductivity of a composite material to a desired level upon heating. In other aspects, the purity, initial expansion temperature, and/or expansion volume can vary from any value recited herein and the invention is not intended to be limited to any particular expandable graphite properties.

Expandable graphite materials are commercially available, for example, from Nyacol Nano Technologies, Inc., Ashland, Mass., USA.

When a small amount of expandable graphite is added to a polymer composition comprising ATH, the heat release rate of the composite can be significantly reduced. While not wishing to be bound by theory, it is believed that expansion of the graphite results in reduced thermal conductivity of that portion of the composite, thus providing an insulative layer between the composite material and the heat source. When no reinforcing fibers are present in the composite, it is believed that at least a portion of the ATH can erupt from the surface to provide an intumescent effect upon heating. When a reinforcing fiber, such as glass fiber, is present in the composite, expansion of the graphite upon heating can provide an erupted or fluffed layer of the reinforcing fiber, for example, at the heated surface, increasing the volume so as to provide an intumescent (i.e., insulative) effect.

Figure 2:
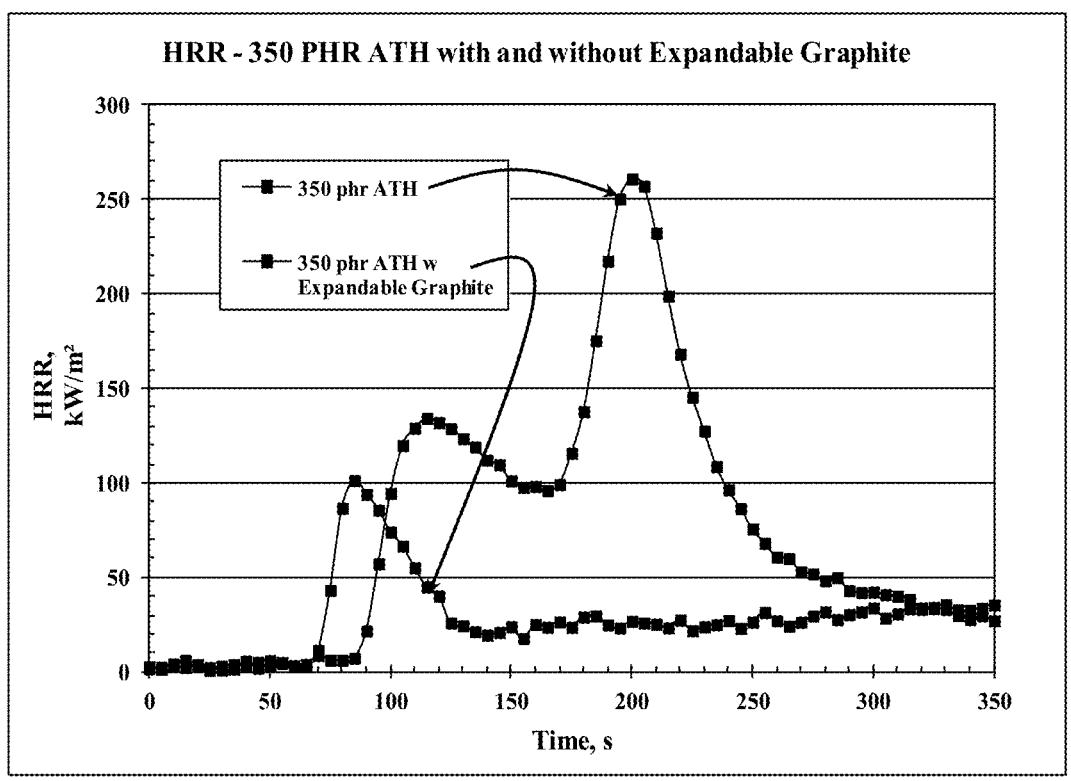
FIG. 2 is a cone calorimetry plot of Heat Release Rate versus time for fiberglass composites with and without expandable graphite (2.7 wt. % based on the weight of ATH present in the composite), each sample comprising 20 wt. % fiberglass and 350 phr ATH, in accordance with various aspects of the present invention.

With respect to FIG. 2, BMC samples containing 20 wt. % fiberglass and 350 phr ATH were prepared. One sample also contained 2.7 wt. % (based on the weight of the ATH in the composite) expandable graphite Upon heating, the sample containing only ATH (i.e., no expandable graphite) exhibited multiple peaks wherein the second peak represents consumption of the ATH and combustion of the BMC. In contrast, the second peak in the sample containing both ATH and expandable graphite is not present. Thus, the rate of decomposition of the ATH has been decreased and therefore the lifetime of the ATH present in the composite has been extended by the presence of the expandable graphite leading to a dramatic decrease in heat release rate.

Figure 3:
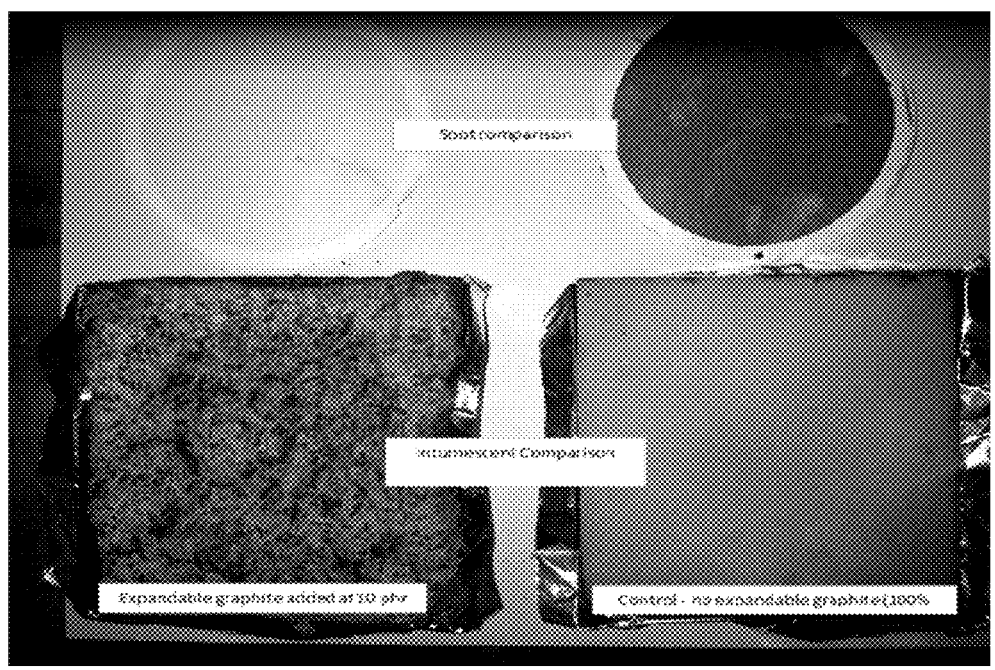
FIG. 3 is a photograph of ATH loaded fiberglass composites, with and without expandable graphite, after combustion, in accordance with various aspects of the present invention. Also illustrated are filter papers from the combustion experiment, illustrating the amount of smoke generated for each sample.

FIG. 3 illustrates ATH containing fiber reinforced composites after combustion. The control sample on the right of the image contained no expandable graphite, whereas the sample on the left contained 10 phr expandable graphite or about 2.85% by wt. ATH. After combustion, the organic phases of both composites have been consumed, leaving behind only inorganic non-combustibles (e.g., alumina and fiberglass). The control sample appears flat and has retained its original thickness of 0.100 inches. In contrast, the expandable graphite containing sample has expanded such that its thickness increased three-fold, exposing the fiberglass in the composite. The increased composite thickness can then act as an insulating layer, reducing the thermal conductivity and thus, the rate of ATH decomposition. Thus, even a very small amount of expandable graphite can increase the efficacy of a given amount of ATH.

In reducing the heat release rate of the composite material, for example, via a reduced rate of polymer pyrolysis, the amount of smoke generated during combustion is also significantly reduced, a very desirable outcome. In cone calorimetry experiments to measure HRR, filter paper is typically utilized to trap particulate matter prior to analysis of combustion gases. The filter paper samples from control and expandable graphite containing samples, both having identical amounts of ATH, are also shown in FIG. 3. The filter paper used during combustion of the control sample is dark, illustrating the large amount of smoke that was generated and trapped during the experiment. In contrast, the filter paper used during combustion of the expandable graphite containing sample exhibits very little color, illustrating the relatively small amount of smoke generated.

Thus, in one aspect, the combination of ATH and expandable graphite can facilitate an increase in the loft of fibers (e.g., fiberglass), if present, in a composite upon heating. This increased loft can provide an insulative effect, improving the efficacy of the ATH thereby reducing the HRR and smoke production upon combustion.

Figure 4:
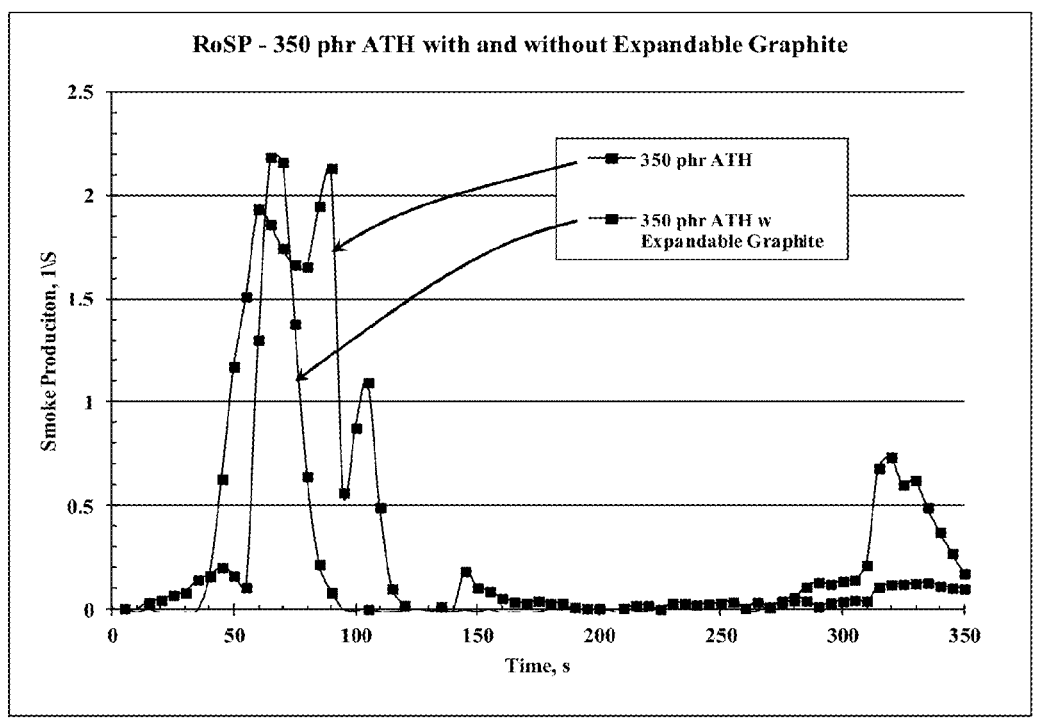
FIG. 4 is a graph illustrating the rate of smoke production (ROSP) versus time during the combustion of ATH loaded fiberglass composite samples with and without expandable graphite, in accordance with various aspects of the present invention.

FIG. 4 illustrated the rate of smoke production (RoSP) for ATH containing fiberglass reinforced BMC samples with and without expandable graphite, wherein the area under each curve represents the total amount of smoke generated (i.e., the Specific Extinction Area or SEA) upon heating. The sample containing expandable graphite exhibits a narrow single peak, indicating a reduced volume of smoke being generated, whereas the control sample exhibits a number of broad peaks. Accordingly, another benefit to the use of both ATH and expandable graphite is a significant reduction in smoke production upon heating.

Figure 5:
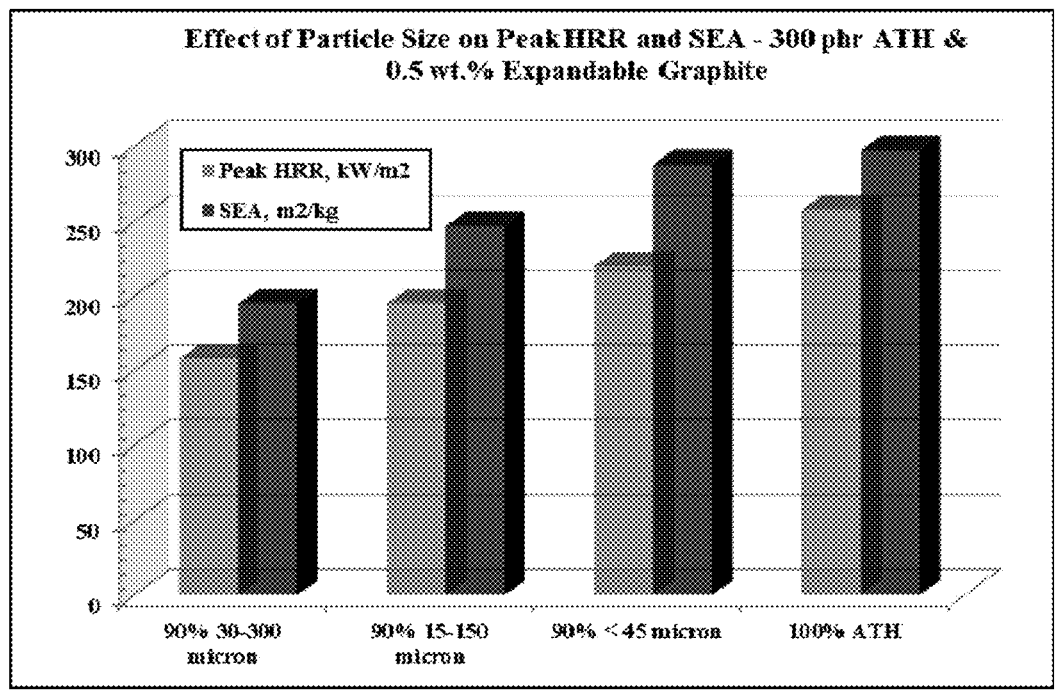
FIG. 5 is bar graph illustrating the effect of expandable graphite particle size on peak Heat Release Rate and Specific Extinction Area (SEA), in accordance with various aspects of the present invention.

In one aspect, the particle size or particle size distribution of expandable graphite for use in the compositions of the present invention can vary, and the invention is not intended to be limited to any particular particle size or particle size distribution. In another aspect, expandable graphites having large particle sizes can be advantageous over similar expandable graphites having small particle sizes. While not wishing to be bound by theory, it is believed that as expandable graphite particle size decreases, the synergistic benefits with ATH alone also decrease. As illustrated in FIG. 5, composites wherein 90% of the expandable graphite particles were smaller than 45 µm exhibited similar performance to samples comprising only ATH. As the expandable graphite particle size increased, the performance (i.e., reduction in HRR and SEA) improved in comparison to the ATH control sample. In another aspect, the size of expandable graphite particles can be selected so as to prevent such particles from being visually detectable in a final composite. Thus, in one aspect, the expandable graphite can have a particle size distribution such that at least about 90% of the particles have a size of from about 30 µm to about 300 µm. It should be understood that the particle size of an expandable graphite material can be a distributional property and that the average and/or distribution of particle sizes within a given sample can vary. In one aspect, no or substantially no expandable graphite particles have a particle size of greater than about 300 µm. In another aspect, at least about 90% of expandable graphite particles have a particle size less than or equal to about 300 µm. In another aspect, a portion of the expandable graphite particles, for example, from about 60% to about 90%, have a particle size of from about 45 µm to about 180 µm. In a specific aspect, about 75% of expandable graphite particles have a particle size of from about 45 µm to about 180 µm. In yet another aspect, a portion of expandable graphite particles, for example, from about 10% to about 40%, have a particle size of less than about 45 µm. In a specific aspect, about 25% of expandable graphite particles have a particle size of less than about 45 µm.

Figure 6:
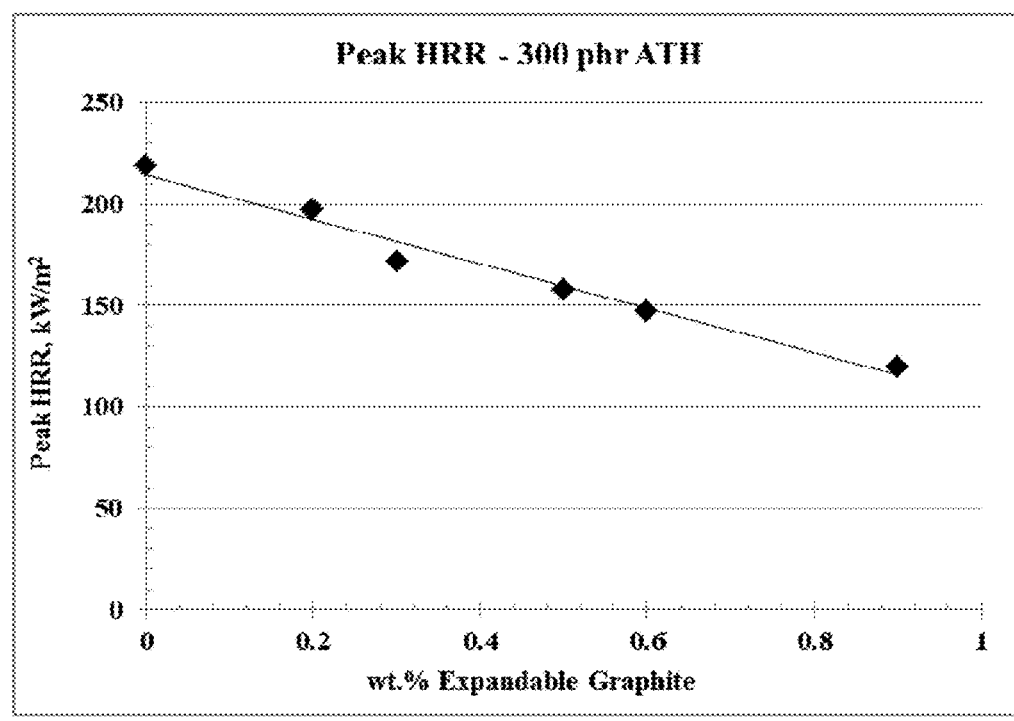
FIG. 6 is a graph illustrating the effect of varying concentrations of expandable graphite on the peak Heat Release Rate of ATH loaded fiberglass composites, in accordance with various aspects of the present invention.
Figure 7:
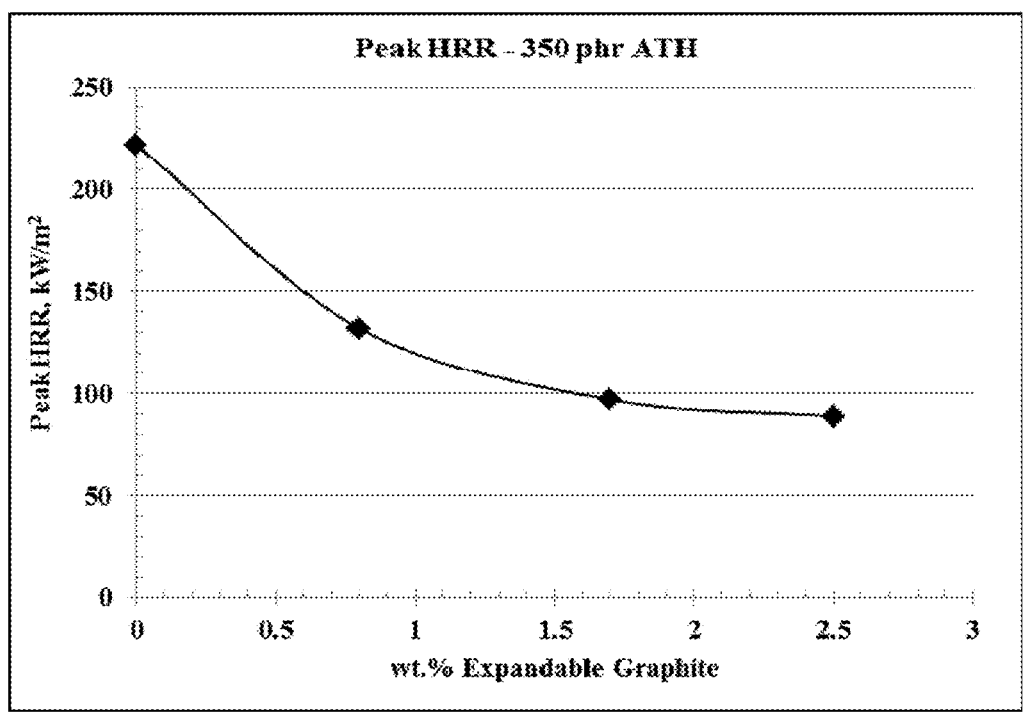
FIG. 7 is a graph illustrating the effect of varying concentrations of expandable graphite on the Heat Release Rate of ATH loaded fiberglass composites, in accordance with various aspects of the present invention.
Figure 8:
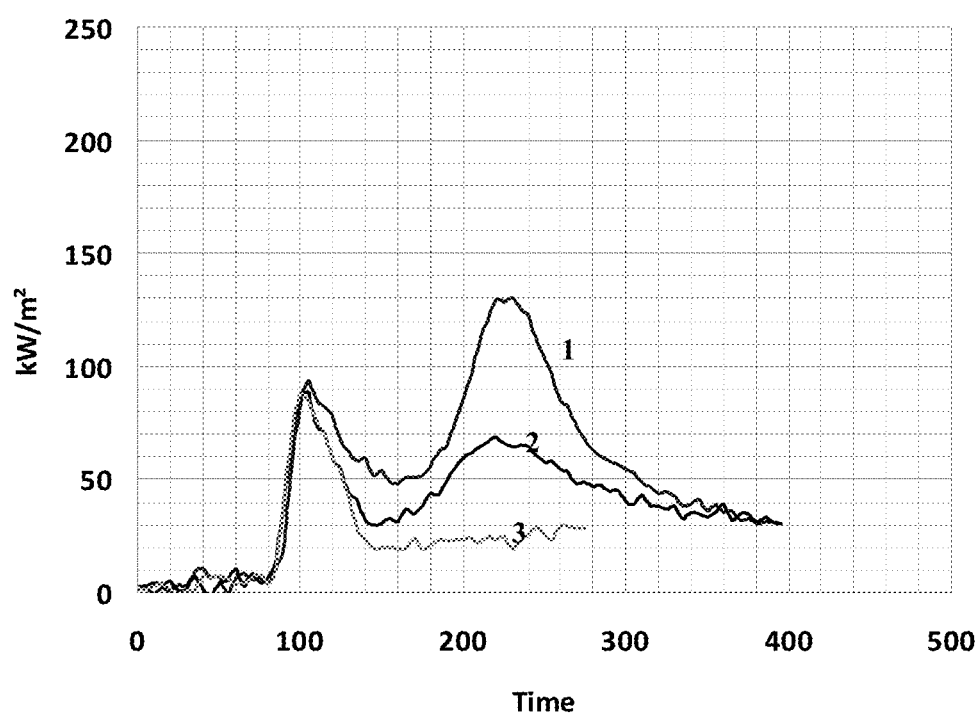
FIG. 8 is a graph illustrating the reduction in peak heat release rate for ATH and expandable graphite loaded composite materials, in accordance with various aspects of the present invention.

In another aspect, the amount of expandable graphite utilized in a reinforced composite material can vary. While expandable graphites can be used at higher loading levels, the synergistic benefits of ATH and expandable graphite in a fiber reinforced composite diminish at concentrations exceeding about 2 wt. %, based on the weight of ATH present in the composite. Thus, in one aspect, the fiber reinforced composite can comprise up to about 1 wt. % expandable graphite, for example, from greater than 0 to about 1 wt. %, or about 0.2, 0.4, 0.6, 0.8, or 1 wt. % expandable graphite, based on the weight of ATH present in the composite. In another aspect, the fiber reinforced composite can comprise up to about 0.5 wt. % expandable graphite, for example, from greater than 0 to about 0.5 wt. %, or about 0.1, 0.2, 0.3, 0.4, or 0.5 wt. % expandable graphite, based on the weight of ATH in the composite. In another aspect, the fiber reinforced composite can comprise up to about 1.5 wt. % expandable graphite, for example, from greater than 0 to about 1.5 wt. %, or about 0.1, 0.3, 0.5, 0.7, 0.9, 1.1, 1.3, or 1.5 wt. % expandable graphite, based on the weight of ATH in the composite. In still other aspects, the fiber reinforced composite can comprise from greater than 0 to about 0.5, 1, or 1.5 wt. % expandable graphite, based on the weight of ATH in the composite. FIGS. 6 and 7 illustrate the peak HRR obtained from heating ATH containing fiber reinforced composite samples containing varying amounts of expandable graphite.

Polyester composites comprising both ATH and expandable graphite can thus exhibit improved flame retardant properties over comparable composites not containing expandable graphite. Fiber reinforced composites, such as a fiberglass reinforced composites can also exhibit improved flame retardant properties even exceeding those for samples not comprising reinforcing fibers. Similarly, the use of expandable graphite in composites can enable a reduced loading of ATH to obtain a desired flame retardancy, while improving the processability (e.g., compounding and molding) of the material. In one aspect, the addition of expandable graphite can facilitate a reduction of up to about 5%, 10%, 15%, 20%, 25% or more in ATH loadings while maintaining similar or better flame retardant properties.

In one aspect, the ATH, fiber, if present, and expandable graphite can be mixed with and/or incorporated into a polymer or mixture of polymers in any order. In another aspect, the expandable graphite or a portion thereof can be mixed with a polymer resin prior to addition of a reinforcing fiber (e.g., fiberglass).

In one aspect, the ATH, or a portion thereof, can be contacted with the expandable graphite, or a portion thereof, prior to contacting with a polymer, fiber, or other components. In another aspect, the ATH and expandable graphite can be mixed, for example, to form a homogeneous or substantially homogeneous mixture, prior to contacting with a polymer, fiber, or other component. In another aspect, a polymer resin, or a portion thereof, can be contacted with ATH and/or expandable graphite, prior to the introduction of fibers or other components.

In another aspect, the ATH, fiber, if present, and expandable graphite can be uniformly or substantially uniformly mixed and/or dispersed in the polymer of the composite. In other aspects, any one or more of the ATH, fiber, if present, and/or expandable graphite can be dispersed in a non-uniform manner so as to form a region or layer having a higher or lower concentration of the respective component.

In another aspect, expandable graphite can be used with other metal hydroxide systems, such as, for example, magnesium hydroxide, or blends of metal hydroxide materials in combination with or in lieu of aluminum trihydrate. In one aspect, other metal hydroxides, such as magnesium hydroxide, can act via the same flame retardant mechanism, endothermic decomposition, even though the respective decomposition temperature can vary.

The present invention can be described by the following exemplary and non-limiting aspects.

Aspect 1: A composition comprising aluminum trihydrate, expandable graphite, and a plurality of reinforcing fibers.

Aspect 2: The composition of Aspect 1, wherein the expandable graphite is present at a level up to about 2 wt. %.

Aspect 3: A composition consisting essentially of aluminum trihydrate and expandable graphite.

Aspect 4: A composite comprising a polymer, a metal hydroxide, and expandable graphite.

Aspect 5: The composite of Aspect 4, wherein the metal hydroxide comprises aluminum trihydrate.

Aspect 6: The composite of Aspect 4, wherein the metal hydroxide comprises magnesium hydroxide.

Aspect 7: The composite of Aspect 4, further comprising a plurality of reinforcing fibers.

Aspect 8: The composite of Aspect 4, wherein the polymer comprises a thermoset polymer.

Aspect 9: The composite of Aspect 4, wherein the polymer comprises a polyester.

Aspect 10: The composite of Aspect 4, wherein the polymer comprises an unsaturated polyester.

Aspect 11: The composite of Aspect 7, wherein the plurality of reinforcing fibers comprise glass fibers.

Aspect 12: The composite of Aspect 7, wherein the plurality of reinforcing fibers comprise from about 15 wt. % to about 50 wt. % of the composite.

Aspect 13: The composite of Aspect 4, wherein ATH is present at a level of from about 150 phr to about 350 phr.

Aspect 14: The composite of Aspect 4, wherein ATH is present at a level of from about 200 phr to about 320 phr.

Aspect 15: The composite of Aspect 4, wherein the expandable graphite is present at a level up to about 2 wt. %, based on the weight of ATH present in the composite.

Aspect 16: The composite of Aspect 4, wherein the expandable graphite is present at a level up to about 1.5 wt. %, based on the weight of ATH present in the composite.

Aspect 17: The composite of Aspect 4, wherein the expandable graphite is present at a level up to about 1 wt. %, based on the weight of ATH present in the composite.

Aspect 18: The composite of Aspect 4, wherein at least about 90% of the expandable graphite has a particle size from about 30 μm to about 300 μm.

Aspect 19: The composite of Aspect 4, exhibiting improved performance under ASTM E-84 testing for surface burning characteristics as compared to a similar composite not comprising expandable graphite.

Aspect 20: The composite of Aspect 4, comprising a lower amount of aluminum trihydrate than a comparable composite and being capable of achieving similar performance under ASTM E-84 testing to the comparable composite.

Aspect 21: The composite of Aspect 4, exhibiting equivalent performance under ASTM E-84 testing to a comparable composite comprising about 10% less ATH.

Aspect 22: The composite of Aspect 4, exhibiting equivalent performance under ASTM E-84 testing to a comparable composite comprising about 20% less ATH.

Aspect 23: A method for preparing a flame retardant composite comprising contacting a polymer, ATH, and expandable graphite.

Aspect 24: The method of Aspect 23, further comprising contacting a plurality of reinforcing fibers with one or more of the polymer, ATH, or expandable graphite.

Aspect 25: The method of Aspect 23, wherein the polymer comprises a thermoset polymer.

Aspect 26: The method of Aspect 23, wherein the polymer comprises a polyester.

Aspect 27: The method of Aspect 24, wherein the plurality of reinforcing fibers comprise glass fibers.

Aspect 28: The method of Aspect 23, wherein ATH is present at a level of from about 150 phr to about 350 phr.

Aspect 29: The method of Aspect 23, wherein the expandable graphite is present up to about 2 wt. %, based on the weight of ATH in the composite.

Aspect 30: The method of Aspect 23, wherein the expandable graphite is present up to about 1.5 wt. %, based on the weight of ATH in the composite.

Aspect 31: The method of Aspect 23, wherein the expandable graphite is present up to about 1 wt. %, based on the weight of ATH in the composite.

Aspect 32: The method of Aspect 23, wherein at least about 90% of the expandable graphite has a particle size from about 30 μm to about 300 μm.

Aspect 33: The method of Aspect 24, wherein the polymer and at least a portion of the expandable graphite are contacted prior to contacting with the plurality of reinforcing fibers.

A composition produced by the method of any of Aspects 23-33.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. It should be noted that the experiments, samples, and data presented herein have not been optimized and are presented as representative of the combination of ATH and expandable graphite in composite materials.

Example 1

Preparation of Masterbatch

In a first example, an exemplary organic resin masterbatch was prepared according to the components in Table 1, below.

TABLE 1

Masterbatch Formulation

| Component | PHR | Wt. % |
|---|---|---|
| Vipel T764-67 isophthalic polyester | 62 | 1054 |
| Microthene FN510 | 5 | 85 |
| Styrene monomer | 20 | 340 |
| LUPEROX ® P | 1.2 | 20 |
| 5% para benzoquinone inhibitor in diallyl phthalate | 0.4 | 7 |
| SR350, trimethylolpropane trimethacrylate | 5 | 85 |
| BYK9010 | 5 | 85 |
| Triethylphosphate | 2 | 34 |
| CF2010 black pigment | 5 | 85 |
| Calcium Stearate | 2 | 34 |
| Industrene B | 2 | 34 |

Example 2

Preparation of Samples Comprising Expanded Graphite

In a second example, sample pastes were prepared using the organic resin masterbatch from Example 1, together with aluminum trihydrate and expandable graphite, as detailed in Table 2, below. A control sample was also prepared that did not contain expandable graphite.

TABLE 2

Samples Comprising Expandable Graphite and ATH

| Sample | Organic Resin (from Ex. 1), g | MOLDX ® A100 (ATH), g | Nyagraph 35 Expandable Graphite | % Expandable Graphite (based on ATH), % |
|---|---|---|---|---|
| Control | 150 | 475 | 0 | 0 |
| 1 | 150 | 472 | 4 | 0.85 |
| 2 | 149 | 470 | 8 | 1.70 |
| 3 | 148 | 467 | 12 | 2.57 |

After forming the paste samples, each paste was subsequently mixed with glass fibers, such that the resulting composition comprised 20 wt. % glass fibers, allowed to maturate for two days, and then pressed to form plaques approximately 0.065 inches thick, 0.100 inches thick, and 0.120 inches thick.

Example 3

Cone Calorimetry of ATH and Expandable Graphite Loaded Polymer Samples

In a third example, the 0.100 inch thick plaque samples prepared in Example 2 were evaluated by cone calorimetry. The results of this analysis for Samples 1-3 are detailed in Table 3, below.

TABLE 3

Cone Calorimetry Results

| | Sample | | | |
|---|---|---|---|---|
| | Control | 1 | 2 | 3 |
| Time to Sustained Ignition | 100 | 98 | 95 | 95 |
| Peak Rate of Heat Release | 263 | 132 | 97 | 89 |
| Total Heat Released | 27.6 | 20.6 | 14.9 | 6.6 |
| Avg. Effective Heat of Combustion | 12.6 | 11.0 | 8.6 | 4.7 |
| Avg Mass Loss Rate | 9.5 | 6.4 | 5.7 | 6.5 |
| Avg SEA | 267 | 159 | 119 | 82 |

As noted in Table 3, even a small amount of expandable graphite present an ATH loaded composite material can result in a reduction in the peak rate of heat release, total amount of heat released, and smoke produced (SEA). This benefit can be attributed to the more efficient use of ATH when expandable graphite is present in the system.

What is claimed is:

1. A composition comprising:
   alumina trihydrate, from greater than 0 to about 2 wt. % expandable graphite based on the weight of the alumina trihydrate; and
   a plurality of reinforcing fibers comprising from about 15 wt. % to about 50 wt. % of the composition, wherein from about 60% to about 90% of the expandable graphite has a particle size from about 45 µm to about 150 µm.

2. The composition of claim 1, wherein the expandable graphite is present at a level from greater than 0 to about 1 wt. % based on the weight of alumina trihydrate.

3. The composition of claim 1, wherein the expandable graphite is present at a level from greater than 0 to about 0.5 wt. %, based on the weight of the alumina trihydrate.

4. A composite comprising:
   a polymer;
   a metal hydroxide;
   from greater than 0 to about 2 wt. % expandable graphite based on the weight of the metal hydroxide; and
   a plurality of reinforcing fibers, wherein the plurality of reinforcing fibers comprise from about 15 wt. % to about 50 wt. % of the composite, and wherein from about 60% to about 90% of the expandable graphite has a particle size from about 45 µm to about 150 µm.

5. The composite of claim 4, wherein the metal hydroxide comprises alumina trihydrate.

6. The composite of claim 4, wherein the metal hydroxide comprises magnesium hydroxide.

7. The composite of claim 4, wherein the polymer comprises a thermoset polymer.

8. The composite of claim 4, wherein the polymer comprises a polyester.

9. The composite of claim 4, wherein the polymer comprises an unsaturated polyester.

10. The composite of claim 4, wherein the plurality of reinforcing fibers comprise glass fibers.

11. The composite of claim 4, wherein the metal hydroxide comprises alumina trihydrate and is present at a level of from about 150 phr to about 350 phr.

12. The composite of claim 4, wherein the metal hydroxide comprises alumina trihydrate, and wherein the expandable graphite is present at a level from greater than 0 to about 1.5 wt. %, based on the weight of alumina trihydrate present in the composite.

13. The composite of claim 4, wherein the metal hydroxide comprises alumina trihydrate, and wherein the expandable graphite is present at a level from greater than 0 to about 1 wt. %, based on the weight of alumina trihydrate present in the composite.

14. The composite of claim 4, wherein at least about 90% of the expandable graphite has a particle size from 30 µm to 300 µm.

15. The composite of claim 4, exhibiting improved performance under ASTM E-84 testing for surface burning characteristics as compared to a composite not comprising expandable graphite.

16. The composite of claim 4, comprising a lower amount of alumina trihydrate than a comparable composite not comprising expandable graphite and being capable of achieving equivalent performance under ASTM E-84 testing to the comparable composite.

17. The composite of claim 4, exhibiting equivalent performance under ASTM E-84 testing to a comparable composite comprising about 10% less alumina trihydrate.

18. The composite of claim 4, exhibiting equivalent performance under ASTM E-84 testing to a comparable composite comprising about 20% less alumina trihydrate.

19. The composite of claim 4, wherein the metal hydroxide comprises alumina trihydrate, and wherein the expandable graphite is present at a level from greater than 0 to about 0.5 wt. %, based on the weight of alumina trihydrate present in the composite.

20. The composite of claim 4, exhibiting improved cone calorimeter performance as compared to an identical composite not comprising expandable graphite.

21. The composite of claim 4, wherein the metal hydroxide comprises alumina trihydrate and is present at a level of from about 200 phr to about 320 phr.

22. The composite of claim 21, wherein at least about 90% of the expandable graphite has a particle size from 30 μm to 300 μm.

23. A method for preparing a flame retardant composite comprising:
   contacting a polymer, alumina trihydrate, from greater than 0 to about 2 wt. % expandable graphite based on the weight of alumina trihydrate, and from about 15 wt. % to about 50 wt. % of a plurality of reinforcing fibers, wherein from about 60% to about 90% of the expandable graphite has a particle size from about 45 μm to about 150 μm.

24. The method of claim 23, wherein the polymer comprises a thermoset polymer.

25. The method of claim 23, wherein the polymer comprises a polyester.

26. The method of claim 23, wherein the plurality of reinforcing fibers comprise glass fibers.

27. The method of claim 23, wherein alumina trihydrate is present at a level of from about 150 phr to about 350 phr.

28. The method of claim 23, wherein the expandable graphite is present from greater than 0 to about 1.5 wt. %, based on the weight of alumina trihydrate in the composite.

29. The method of claim 23, wherein the expandable graphite is present from greater than 0 to about 1 wt. %, based on the weight of alumina trihydrate in the composite.

30. The method of claim 23, wherein at least about 90% of the expandable graphite has a particle size from 30 μm to 300 μm.

31. The method of claim 23, wherein the polymer and at least a portion of the expandable graphite is contacted prior to contacting with the plurality of reinforcing fibers.

32. A composition produced by the method of claim 23.

33. The method of claim 23, wherein the expandable graphite is present from greater than 0 to about 0.5 wt. %, based on the weight of alumina trihydrate in the composite.

34. A composite comprising:
   a thermoset polymer;
   alumina trihydrate;
   from greater than 0 to about 1 wt. % expandable graphite based on the weight of the alumina trihydrate, wherein at least about 90% of the expandable graphite has a particle size from 30 μm to 300 μm, and from about 60% to about 90% of the expandable graphite has a particle size from about 45 μm to about 150 μm; and
   from about 15 wt. % to about 50 wt. % of the composite of a plurality of reinforcing fibers comprising glass fibers.

* * * * *